(12) United States Patent
Matsumoto et al.

(10) Patent No.: US 11,394,261 B2
(45) Date of Patent: Jul. 19, 2022

(54) METHOD OF MANUFACTURING ROTOR

(71) Applicant: TOYOTA JIDOSHA KABUSHIKI KAISHA, Toyota (JP)

(72) Inventors: Masashi Matsumoto, Nagoya (JP); Haruki Kusamaki, Okazaki (JP); Hazuki Kawamura, Nisshin (JP); Kohei Watanabe, Okazaki (JP); Yuki Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 16/711,540

(22) Filed: Dec. 12, 2019

(65) Prior Publication Data

US 2020/0212743 A1    Jul. 2, 2020

(30) Foreign Application Priority Data

Dec. 26, 2018   (JP) .............................. JP2018-242873

(51) Int. Cl.
| | | |
|---|---|---|
| H02K 15/10 | (2006.01) | |
| H02K 1/32 | (2006.01) | |
| H02K 15/03 | (2006.01) | |
| H02K 1/276 | (2022.01) | |

(52) U.S. Cl.
CPC .............. *H02K 1/32* (2013.01); *H02K 1/276* (2013.01); *H02K 15/03* (2013.01); *Y10T 29/49012* (2015.01)

(58) Field of Classification Search
CPC ............ H02K 1/276; H02K 1/27; H02K 3/34; H02K 15/03; Y10T 29/49009; Y10T 29/49012; Y10T 29/49075; Y10T 29/53143

USPC ...... 29/598, 596, 602, 1, 604, 607, 732, 734
See application file for complete search history.

(56) References Cited

U.S. PATENT DOCUMENTS 6,800,967 B2* 10/2004 Oshima ................. H02K 1/276
                                                         310/12.25
2013/0200734 A1   8/2013 Greer

FOREIGN PATENT DOCUMENTS

| JP | 9-252568 A | 9/1997 |
|---|---|---|
| JP | 2005-12859 A | 1/2005 |
| JP | 2005-218274 A | 8/2005 |
| JP | 2006-067777 A | 3/2006 |
| JP | 2007-174872 A | 7/2007 |
| JP | 2009-50105 A | 3/2009 |
| JP | 2010-141989 | * 6/2010 |

OTHER PUBLICATIONS

U.S. Appl. No. 16/576,873, filed Sep. 20, 2019, Hazuki Uryu.

* cited by examiner

*Primary Examiner* — Thiem D Phan
(74) *Attorney, Agent, or Firm* — Oblon, McClelland, Maier & Neustadt, L.L.P.

(57) ABSTRACT

Disclosed are: preparing a rotor core having a plurality of magnet holes spaced near a circumferential edge of the rotor core; preparing a plurality of permanent magnet units each including a porous body and a magnet main body disposed in contact with each other; and inserting the permanent magnet units into the magnet holes and securing the permanent magnet units in the magnet holes.

6 Claims, 4 Drawing Sheets

METHOD OF MANUFACTURING ROTOR

CROSS REFERENCE TO RELATED APPLICATION

This application claims priority to Japanese Patent Application No. 2018-242873 filed on Dec. 26, 2018, which is incorporated herein by reference in its entirety including the specification, claims, drawings, and abstract.

TECHNICAL FIELD

The present disclosure relates to a method of manufacturing a rotor including a plurality of magnets spaced near the circumferential edge of the rotor.

BACKGROUND

A high-output motor such as a motor for driving a vehicle generates a large amount of heat. Thus, a rotor and a stator are often cooled by a refrigerant such as oil. JP 2009-50105 A discloses a proposal in which a porous body is disposed between a stator and a case, and a refrigerant is supplied to the porous body to promote cooling of the stator.

Here, according to JP 2009-50105 A, the outer circumference of the stator core is put into contact with the refrigerant to thereby cool the stator. On the other hand, for a permanent magnet motor, a large amount of heat is generated at the magnet of a rotor, and an issue of deterioration of the magnet may arise. Thus, it is desirable to more effectively cool the magnet of the rotor.

SUMMARY

According to a method of manufacturing a rotor, the method includes: preparing a rotor core having a plurality of magnet holes spaced near a circumferential edge of the rotor core; preparing a plurality of permanent magnet units each including a porous body and a magnet main body disposed in contact with each other; and inserting the permanent magnet units into the magnet holes and securing the permanent magnet units in the magnet holes.

The porous body may surround the magnet main body.

According to the present disclosure, the flow of the refrigerant through the porous body can effectively cool the magnet main body.

BRIEF DESCRIPTION OF DRAWINGS

Embodiment(s) of the present disclosure will be described based on the following figures, wherein:

FIG. 2A is a front view of the permanent magnet unit in the longitudinal direction thereof; and FIG. 2B is a cross-sectional view taken along line A-A of FIG. 2A;

DESCRIPTION OF EMBODIMENTS

Hereinafter, an embodiment of the present disclosure will be described by reference to the drawings. Note that the present disclosure is not limited to the embodiment described herein.

<Configuration of Motor>

Figure 1:
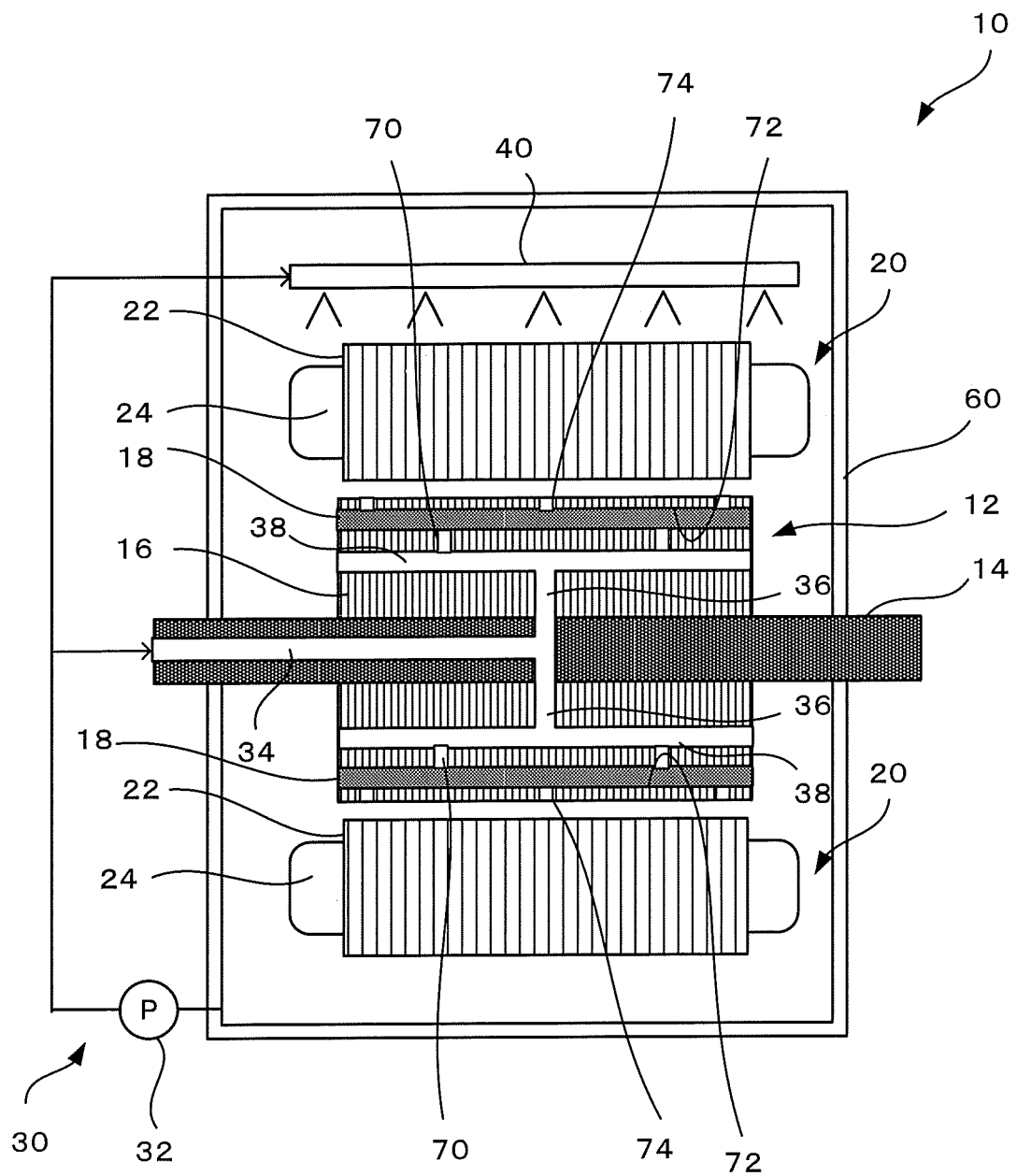
FIG. 1 is a view of a schematic configuration of a motor.

FIG. 1 is a view of a schematic configuration of a motor 10. As illustrated in FIG. 1, the motor 10 includes a rotor 12 and a stator 20 in a case 60.

The rotor 12 has a rotor core 16 secured to a rotor shaft 14 rotatably supported to the case 60 via a bearing (not illustrated). The rotor core 16 has a cylindrical shape, and a plurality of permanent magnet units 18 extending axially is provided at location near the outer circumference of the rotor core 16.

The stator 20 has an annular shape, and is held in the case 60 such that the inner circumferential side of the stator 20 is opposed to the outer circumference of the rotor 12. In addition, the stator 20 has a stator core 22, and a coil 24 wound around teeth provided on the inner circumferential side of the stator core 22. FIG. 1 illustrates the coil ends of the coil 24 projecting axially from the stator core 22.

An alternating-current drive current is supplied to the coil 24 of the stator 20, and an electromagnetic force in the coil 24 generated by the alternating-current drive current supplied causes the rotor 12 to rotate in relation to the stator 20.

According to the present embodiment, the motor 10 is provided with a cooling apparatus 30 that circulates a refrigerant (oil) through the rotor 12 and the stator 20 to thereby cool the rotor 12 and the stator 20. That is, a refrigerant accumulated in the inner bottom of the case 60 is cooled as required, and then is supplied to the rotor 12 and the stator 20 through a pump 32.

A flow passage 34 extending axially is provided in the rotor shaft 14, and a plurality of flow passages 36 are provided radially outward from the flow passage 34. Each of the flow passages 36 extends from inside the rotor shaft 14 to inside the rotor core 16, and is connected to a flow passage 38 extending axially inside the rotor core 16. A plurality of flow passages 70 are connected to the flow passage 38, the flow passages 70 extending radially further toward the outer circumferential side of the rotor core 16. The flow passages 70 put the flow passage 38 into connection with a plurality of magnet holes 72 extending axially. A plurality of flow passages 74 are connected to the magnet holes 72, respectively. The flow passages 74 extend radially to the outer circumferential end of the rotor core 16, the flow passages 74 being open to the outer circumference of the rotor core 16.

When the refrigerant is supplied to the flow passage 34 through a pump 32, the refrigerant from the flow passage 38 is discharged radially from the rotor core 16 through the flow passages 70, the magnet holes 72, and the flow passages 74, and then returns to the inner bottom of the case 60.

Permanent magnet units 18 are inserted in the magnet holes 72, respectively. Each of the permanent magnet units 18 has a porous body that allows the refrigerant to pass therethrough. Here, in this example, both of the axial ends of the flow passage 38 are closed, and the refrigerant flows to the magnet holes 72. However, both ends of the flow passage 38 may be open so as to appropriately maintain the flow rate of each flow passage.

Furthermore, a cooling pipe 40 having a plurality of discharge ports on the lower side thereof is provided above the stator core 22. With this arrangement, supply of the refrigerant to the cooling pipe 40 through the pump 32 causes the refrigerant to fall to the stator core 22 and the coil 24, and then the refrigerant having fallen returns to the inner bottom of the case 60.

In such a manner, the cooling apparatus 30 cools the rotor 12 and the stator 20.

<Configuration of Permanent Magnet Unit>

Figures 2A, 2B:
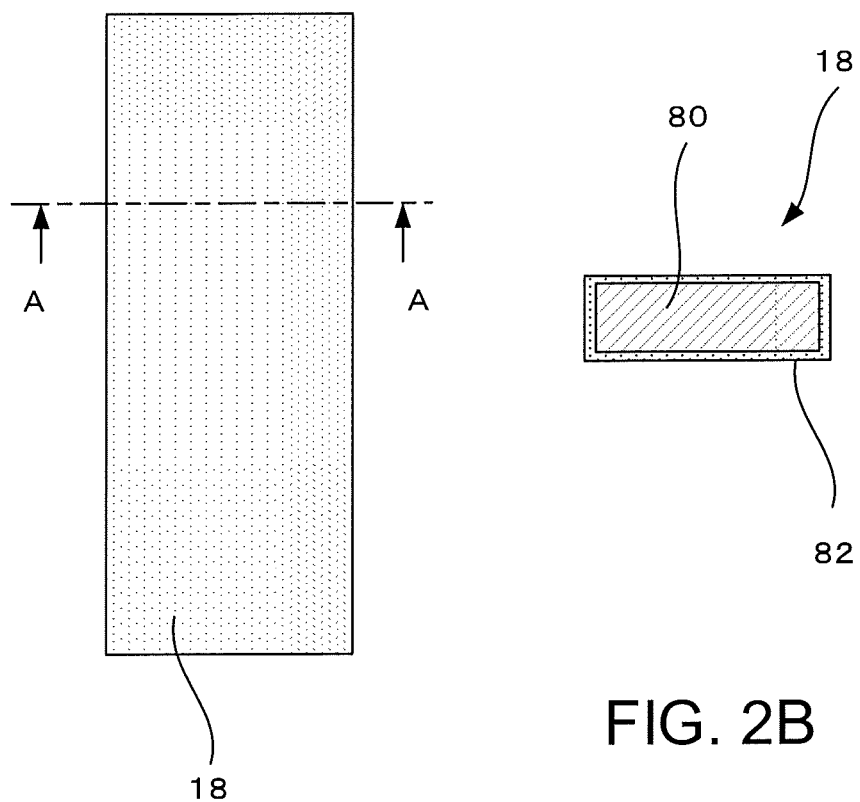
FIGS. 2A and 2B are views of a configuration of a permanent magnet unit.

FIGS. 2A and 2B are views of a configuration of the permanent magnet unit 18. FIG. 2A is a front view of the permanent magnet unit 18 in the longitudinal direction thereof. FIG. 2B is a cross-sectional view taken along line A-A of FIG. 2A. According to this example, the permanent magnet unit 18 includes a magnet main body 80 and a porous body 82. That is, the porous body 82 is provided covering (surrounding) the four side faces of the permanent magnet unit 18 having a rectangular column shape. With this arrangement, the porous body 82 is located between the inner face of the magnet hole 72 and the outer face of the permanent magnet unit 18. The porous body 82 can include a material similar to the material of a porous body 52.

Figure 3:
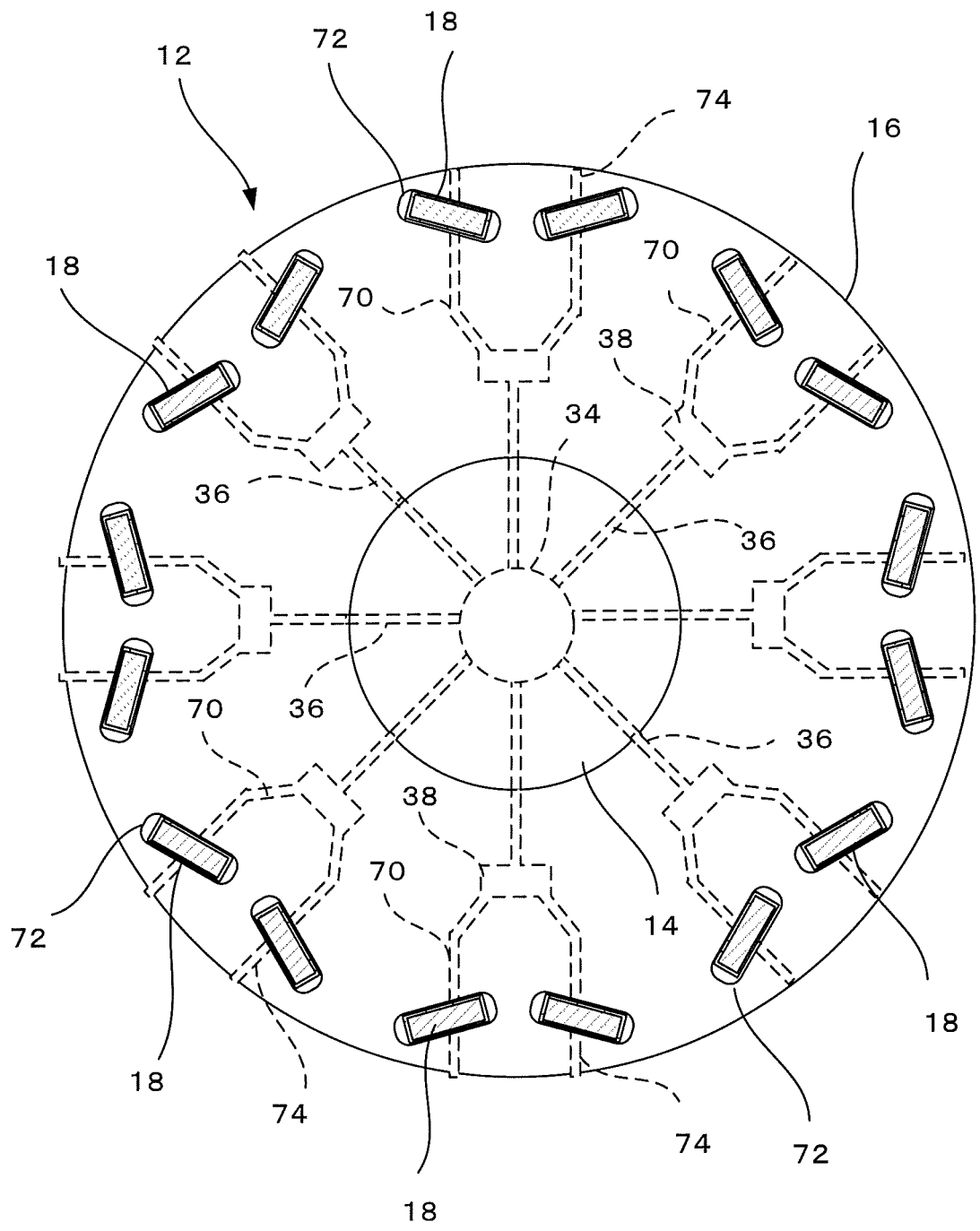
FIG. 3 is a view of a rotor core viewed axially.

FIG. 3 is a view of the rotor core 16 viewed axially. As illustrated in FIG. 3, the magnet holes 72 for inserting the permanent magnet units 18 thereinto are disposed at a predetermined pitch at a location near the circumferential edge of the rotor core 16. Permanent magnet units 18 are inserted and secured in paired magnet holes 72, respectively, to form one set of magnetic poles. Each of the magnet holes 72 is formed slightly larger than the permanent magnet unit 18 inserted therein. In particular, the magnet hole 72 has a space extending axially, at each circumferential end of the magnet hole 72. An adhesive (e.g., high temperature resistant epoxy adhesive) or the like may be inserted into the space, or the space may remain intact. In a case where the spaces remain intact, stoppers may be provided at the axial ends, respectively, the stoppers being formed by caulking the plurality of magnetic plates (e.g., electromagnetic steel plates) included in the rotor core 16 so as to prevent coming off of the permanent magnet unit 18 from the magnet hole 72.

According to such a configuration, the porous body 82 intervenes between the magnet main body 80 and the magnet hole 72. The refrigerant supplied from the flow passage 70 passes through the porous body 82 and is discharged outward via the flow passage 74.

The permanent magnet units 18 generate a large amount of heat in the rotor 12. According to the present embodiment, the refrigerant comes into direct contact with the magnet main bodies 80 via the porous bodies 82. Thus, the refrigerant can effectively cool the rotor 12.

Here, as each of the porous bodies 82, a porous body having open-cell pores is adopted such that the refrigerant can flow inside the porous body. Examples of the porous body 82 that can be adopted include various materials: porous synthetic resin; porous ceramic, porous glass; and porous metal. Various porous metals are commercially available and can be appropriately selected and used. In particular, use of a sheet-like porous metal facilitates the process.

When a metal is used as the porous body 82, for example, aluminum can be adopted. Furthermore, the porous body 82 can also serve as a magnetic body, with use of a metal such as iron or an iron alloy.

<Manufacturing Process>

Figure 4:
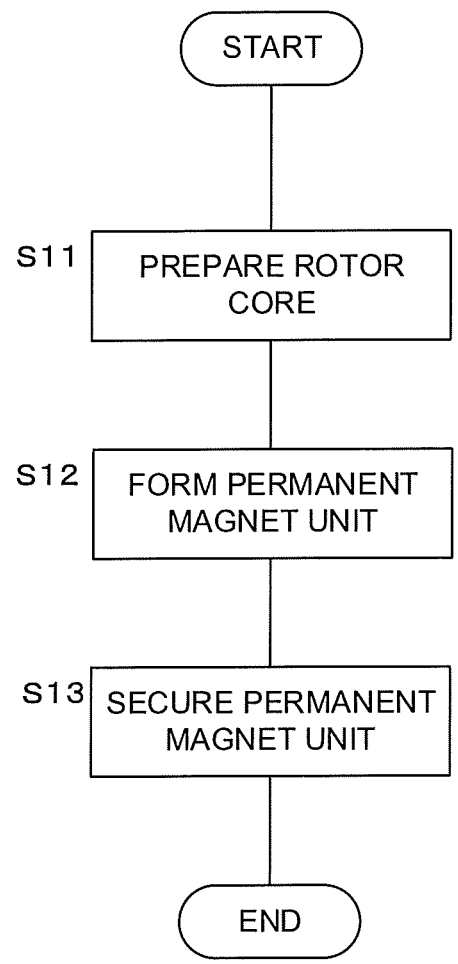
FIG. 4 is a flowchart of a method of manufacturing a rotor.

FIG. 4 is a flowchart of a method of manufacturing the rotor 12. When the rotor 12 of the present embodiment is manufactured, a rotor core 16 having magnet holes 72 formed at portions near the circumferential edge of the rotor core 16 such as illustrated in FIG. 3 is prepared (S11). The rotor core 16 may be formed by layering magnetic plates having the magnet holes 72 formed thereat. An electromagnetic steel plate or the like is adopted as a magnetic plate.

Next, a magnet main body 80 including a permanent magnet is surrounded with a porous body 82 to form a permanent magnet unit 18 (S12). A plurality of permanent magnet units 18 are prepared corresponding to the number of magnet holes 72. For example, sheet-like porous aluminum is used as the porous body 82. In this case, the porous body 82 is wound around the magnet main body 80 to form the permanent magnet unit 18.

Then, the permanent magnet unit 18 is inserted into the magnet hole 72, and the permanent magnet unit 18 is secured in the magnet hole 72 with an adhesive or the like (S13).

The invention claimed is:

1. A method of manufacturing a rotor, comprising:
preparing a rotor core having a plurality of magnet holes spaced near a circumferential edge of the rotor core;
preparing a plurality of permanent magnet units each including a porous body and a magnet main body disposed in contact with each other, wherein the porous body includes open-cell pores configured to allow refrigerant to flow inside the porous body; and
inserting the permanent magnet units into the magnet holes and securing the permanent magnet units in the magnet holes.

2. The method according to claim 1, wherein
the porous body surrounds the magnet main body.

3. The method according to claim 1, wherein
the rotor core includes an axially extending flow passage and a plurality of flow passages provided between the magnet holes and the axially extending flow passage, and
the refrigerant is supplied to the magnet holes through the axially extending flow passage and the plurality of flow passages.

4. A rotor, comprising:
a rotor core having a plurality of magnet holes spaced near a circumferential edge of the rotor core;
a plurality of permanent magnet units each including a porous body and a magnet main body disposed in contact with each other, wherein the porous body includes open-cell pores configured to allow refrigerant to flow inside the porous body; and
wherein the permanent magnet units are secured inside the magnet holes.

5. The rotor according to claim 4, wherein
the porous body surrounds the magnet main body.

6. The rotor according to claim 4, wherein
the rotor core includes an axially extending flow passage and a plurality of flow passages provided between the magnet holes and the axially extending flow passage, and
the refrigerant is supplied to the magnet holes through the axially extending flow passage and the plurality of flow passages.

* * * * *